United States Patent [19]

Delfer, III

[11] Patent Number: 5,264,665
[45] Date of Patent: Nov. 23, 1993

[54] POSTAL PROCESSING SYSTEM

[76] Inventor: Frank W. Delfer, III, 7560 Shelborne Dr., Loomis, Calif. 95650

[21] Appl. No.: 903,599

[22] Filed: Jun. 24, 1992

[51] Int. Cl.$^5$ .................. G01G 19/40; G01G 19/52; G06F 15/20
[52] U.S. Cl. .................. 177/25.15; 177/50; 364/464.03
[58] Field of Search ............ 364/464.02, 464.03; 177/25.15, 50

[56] References Cited

U.S. PATENT DOCUMENTS

| | | | |
|---|---|---|---|
| 4,797,830 | 1/1989 | Baggarly et al. | 364/464.03 |
| 4,809,187 | 2/1989 | Adams | 364/464.03 |
| 5,058,030 | 10/1991 | Schumacher | 364/464.02 X |
| 5,068,797 | 11/1991 | Sansone et al. | 364/464.02 X |
| 5,072,401 | 12/1991 | Sansone et al. | 364/464.02 X |
| 5,177,687 | 1/1993 | Baggarly et al. | 364/464.03 |

Primary Examiner—George H. Miller, Jr.
Attorney, Agent, or Firm—James M. Ritchey

[57] ABSTRACT

A computer directed system is disclosed for optimizing the tracking of mailing pieces containing various inserts and increasing the efficiency and cost benefits derived from utilizing a postal agency's mailing discount rates for sending the mailing pieces through the mail. Weight and thickness data for each mailing piece are employed by the system for the optimization.

10 Claims, 4 Drawing Sheets

POSTAL PROCESSING SYSTEM

BACKGROUND OF THE INVENTION

1. Field of the Invention

Disclosed is a computer directed system for optimizing direct mailing costs, minimizing the amount of delay in grouping, according to a postal agency's rules, mailable items for mailing, and tracking mailed items.

2. Description of the Background Art

For individuals and businesses processing a considerable quantity of mail, postal agencies, like the United States Postal Service (USPS), often have available various discount direct mailing rates. Taking advantage of these lower rates is often the difference between a profitable and nonprofitable enterprise. However, to benefit from these discount mailing rates several stiff hurdles exist. Hopefully, to maximize the efficiency of an operation and to lower costs, the postal agency attaches rigorous rules and regulations that, until the creation of subject system, have required a substantial loss of time in sending the mail out the door of the business and into the hands of the postal agency. Postal discount rate qualification rules present a gradient in benefits. For example, the USPS has "traying rules" which set the requirements for the type of mail that is placed in a standard mailing tray. Such considerations as grouping zip codes within a tray, sequencing zip codes, listing carrier routes, filling a mailing tray to its total thickness or height and weight limits, and the like all serve to build additional postal discounts. The subject computer directed system serves to maximize the postal discount by overseeing the mailing process within the framework of the postal rules.

By way of example concerning the prior state of the art for mailing items within a mailing tray, each individual mailing tray needed to be arranged by hand to take full advantage of the postal discounts. Also, time was being wasted while the necessary mailing pieces were being fitted into the various mailing trays to achieve mailing tray total thickness or height and weight mailing rules benefits.

Further, for the first time the subject system provides a means for tracking a mailed item through its course from being mailed to delivery to a consumer. With the subject system a label and record are generated indicating exactly which customer mailing pieces are within which mailing tray when they leave the processing facility. Should a customer claim they have not received their mailing piece, that piece and the other mailing pieces within the same mailing tray proximate the lost mailing piece can be followed to see if the tray proceeded along the expected path and that the other customers within that tray received their mailing pieces.

SUMMARY OF THE INVENTION

An object of the present invention is to present a computer directed system for discounted direct mailing that optimizes the postal discount for the mailing.

Another object of the present invention is to produce a computer directed system that minimizes the amount of work and time involved in producing acceptably filled mailing trays.

A further object of the present invention is to create a computer directed system that facilitates tracking of mailed pieces to a final destination.

An additional object of the present invention is to provide a computer directed system which accumulates and presents relevant data concerning mailing pieces sent and postage due.

Yet an additional object of the present invention is to furnish a computer directed system that electronically transfers funds in payment of the postage due in a direct mailing process.

Disclosed is a computer directed system for use by an operator engaged in sending mailing pieces via a postal agency. Each mailing piece is sent to a specific consumer and comprises a sending envelope containing various types and quantities of inserts. By utilizing the postal agency's mailing discount rates, that require adherence to a set of postal agency qualification rules, the computer directed system optimizes the efficiency of the mailing and the derived cost benefits. Further, if a mailing piece is lost during the mailing process, the lost mailing piece may be tracked by following a data trail from creation to supposed delivery.

More specifically, the subject system comprises means for determining an individual weight and thickness of each insert type placed in the sending envelope and the sending envelope and for communicating the individual weight and thickness determinations to a data processing location. Included are means for inserting selectively each insert into the sending envelope to produce the mailing piece, as directed from the data processing location. Means are provided for loading a plurality of mailing trays with a plurality of the mailing pieces. Means are furnished for printing and applying a mailing tray label for each loaded mailing tray. Each mailing tray label indicates which specific consumers' mailing pieces are placed in each loaded mailing tray, as directed from the data processing location. Means are given for determining an actual weight of each loaded mailing tray along with means for comparing the actual weight of each loaded mailing tray with a projected weight. The comparison is to establish an acceptable weight variance between the two and for rejecting each loaded mailing tray not within the acceptable weight variance. Each loaded mailing tray projected weight is provided from the data processing location. Also, means are supplied for determining the actual number of mailing pieces loaded into each mailing tray and means for rejecting each mailing tray not having the actual number of mailing pieces the same as the projected number of mailing pieces.

Directing the subject system is a computer at the data processing location. The computer has data storage means with information files containing consumer data indicating a quantity for each insert type to be inserted into each sending envelope. Also, files contain the postal agency qualification rules employed for the optimization. Additional files contain the communicated individual weight and thickness determinations for each insert type and the sending envelope as well as weight data for the mailing tray in an unloaded state.

The subject computer or computers contain instructions in a program or programs for utilizing the information files for processing the efficiency and cost benefits optimization. Several steps are involved in the processing and include calculating from the communicated individual thickness determinations a projected number of mailing pieces within each loaded mailing tray, wherein the projected thickness is acceptable under the postal agency rules. The acceptable number of mailing pieces held in each mailing tray is based on a calculated projected total thickness or height for each mailing piece and is determined by combining the communicated individual thicknesses of each sending envelope and the inserts within each sending envelope and determining if the projected total thickness meets the postal agency rules for an acceptable total thickness or height of a loaded mailing tray. Included in the computer programming is a process for calculating the projected weight of each loaded mailing tray from the mailing tray weight, the communicated individual weights, and the projected number of mailing pieces within each loaded mailing tray. The loaded mailing tray projected weight is communicated to the comparison means, usually a stand-alone computer, for accepting or rejecting each mailing tray. In addition, the program determines, based on the projected number of mailing pieces within each the loaded mailing tray, a range indicating which specific consumers are within each loaded mailing tray and directs the mailing tray label printing and applying means to denote the range of specific consumers on the mailing tray label. Usually, the mailing tray printing and mailing means prints and applies in addition to the mailing tray label an ACT tag indicating a destination airport location for the mailing tray.

Generally, means are provided for creating a mailing manifest, with associated postage data, and for printing the mailing manifest and postage data in report form as directed by the computer. Also, means are provided for creating a mailing manifest, with associated postage data, and for electronically transferring the created mailing manifest and postage data to a facility for transferring funds in payment of postage due for sending the mailing pieces.

Other objects, advantages, and novel features of the present invention will become apparent from the detailed description that follows, when considered in conjunction with the associated drawings.

DESCRIPTION OF THE PREFERRED EMBODIMENT

Figure 1A:
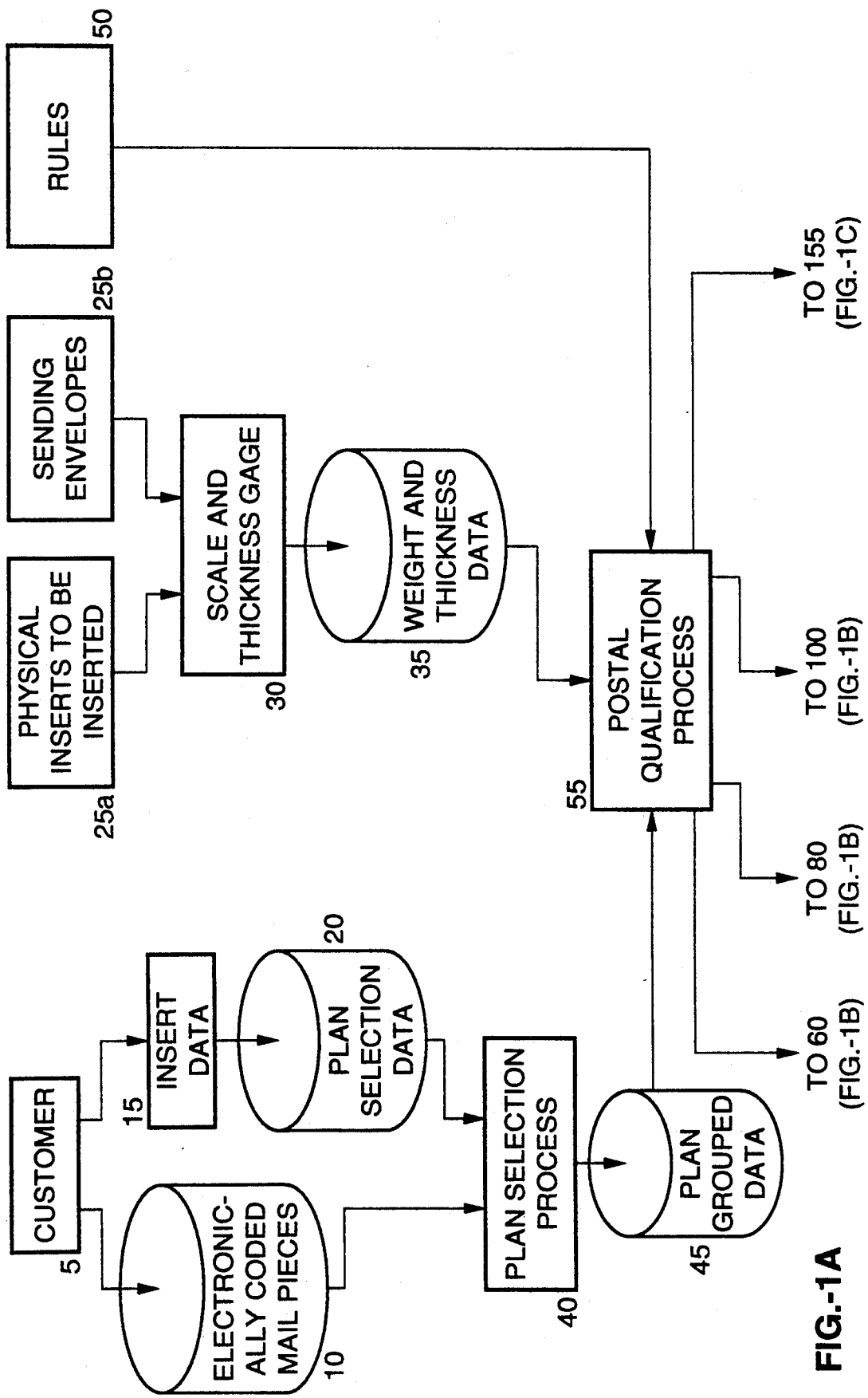
FIG. 1A is a flow diagram indicating information concerning a customer's mailing plan, weight and thickness data, and rules entering the subject system's postal qualification process.
Figure 1B:
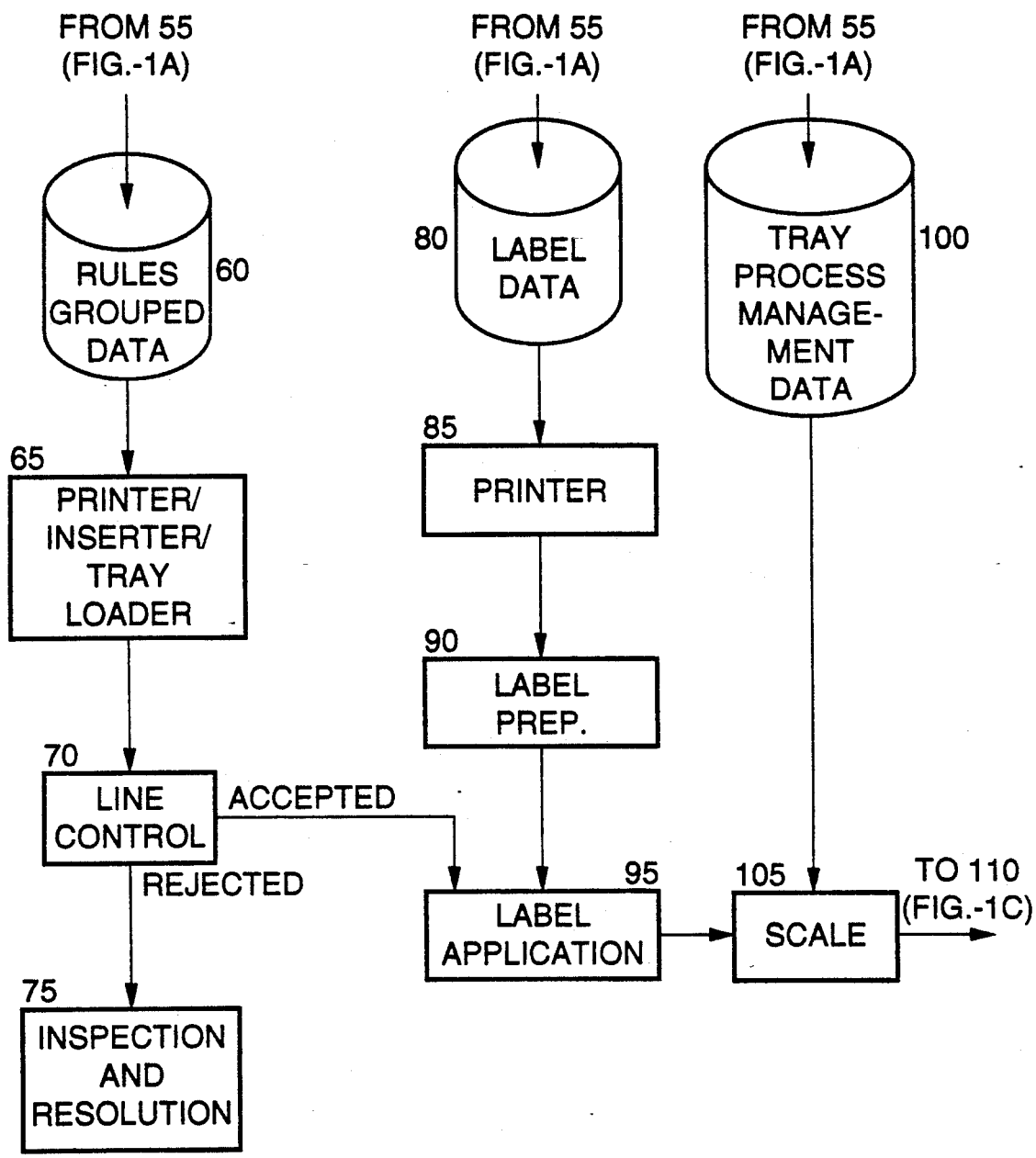
FIG. 1B is a flow diagram indicating information leaving the subject system's postal qualification process for optimizing the loading of mailing trays and printing tray labels.
Figure 1C:
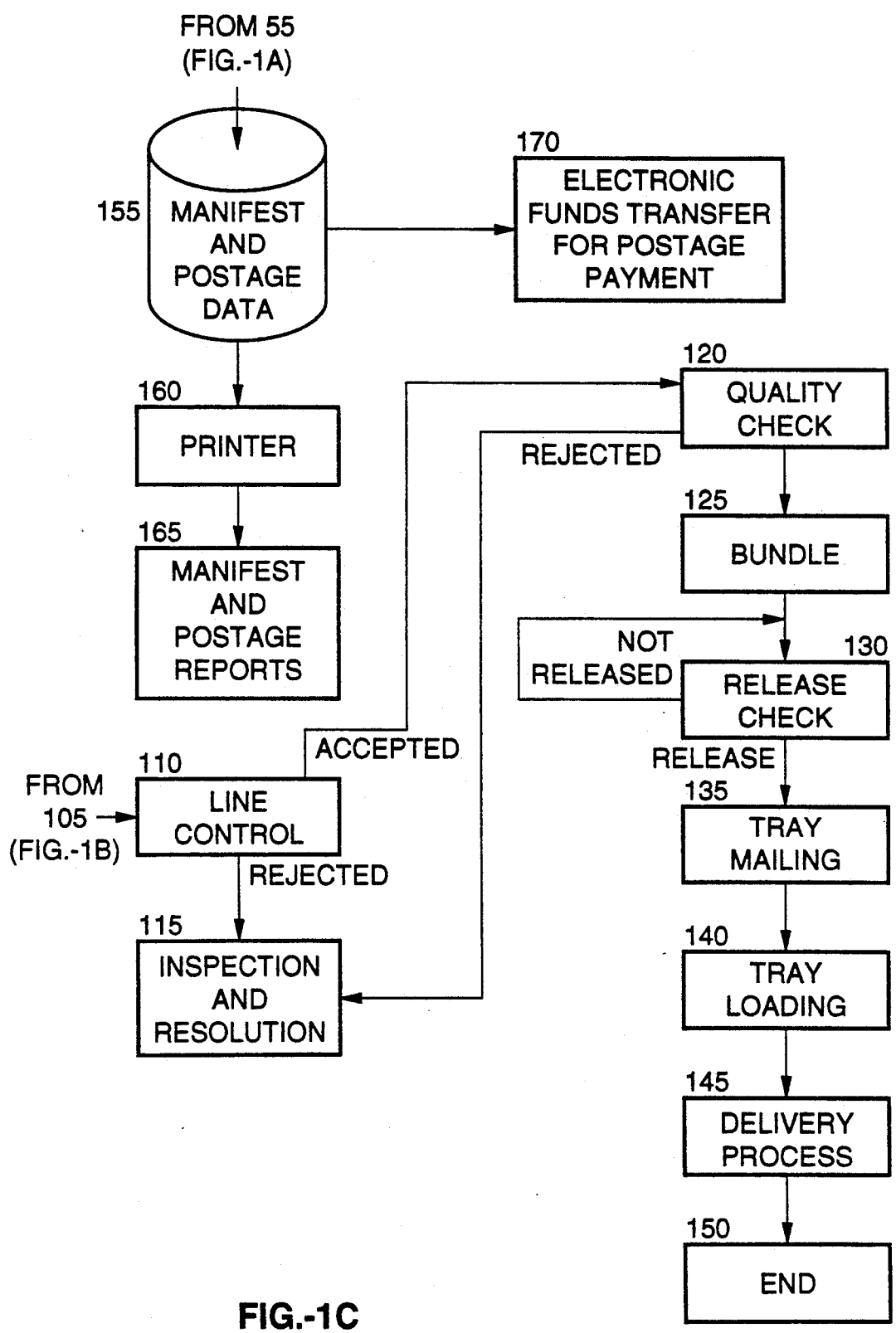
FIG. 1C is a flow diagram indicating information leaving the subject system's postal qualification process for finalizing and checking the optimization of loading mailing trays, for creating a postal manifest and postage reports, and for electronically transferring postage payment funds.

Referring now to FIGS. 1A, 1B, and 1C, there is shown a preferred embodiment of a computer directed system for use by an operator in sending mailing pieces through the mail. FIGS. 1A, 1B, and 1C are all part of one large flow diagram and interconnect to one another as indicated in the figures (basically, FIG. 1A is positioned above FIGS. 1B and 1C, with FIG. 1B to the left of FIG. 1C). For purposes of explanation, the subject system is discussed in terms of an operator of the mailing system, a customer who hires the operator to perform a mailing job, and a consumer to whom a mailed item is sent. Other combinations and variations of this basic pattern of parties is considered to be within the realm of this disclosure. Generally, the figures relate to the information and processing flow that occurs at the operator's mailing facility (except the final delivery process and funds transfer, see below).

Each mailed item is termed a mailing piece and comprises a sending envelope containing various types and quantities of inserts. The sending envelope is of any standard type and may have an address window and mailing associated indicia. Inserts are of several types such as billing statements on one or more pages, forms, advertisements, general informational items, coupons, return envelopes, and the like. Additionally, each insert may need to be folded one or more times before it is inserted into a sending envelope.

The subject system is directed from a data processing location by at least one programmed computer and, generally, more than one computer is involved. Usually, a central computer processes the bulk of the information and processing line control computers handle particular subdivisions of the mailing process like thickness and weight comparisons, as indicated in detail below. In any case, the central computer oversees the operation of the system and communicates with or directs the individual components of the subject system.

Usually, the operator deals with many customers, however, for clarity, one such customer 5 is indicated in FIG. 1. That customer 5 has a particular collection of consumers that are to receive mailing pieces. Associated with the collection of consumers is a consumer data base 10 that contains electronically coded zip codes, carrier routes, customer text, statement information, graphic information (for printing a logo on a billing statement and the like), and similar mailing, billing, and general informational items.

The customer 5 supplies insert data 15 to the operator indicating a set of exact inserting instruction or a plan for each particular mailing. Included in the inserting instructions plan are directions indicating which types of inserts are to be included in each mailing piece. The plan selection data 20 is then stored for use by the system's central computer.

In order to fulfill the requirements of the postal agency's direct mail traying rules exact information is obtained concerning the sending envelope and inserts. As seen in FIG. 1, different types of physical inserts (including bills that need to be printed, return envelopes, ads, and the like as indicated above) 25a and sending envelopes 25b are sent to suitable instruments for determining individual weights and thicknesses 30. Some of the inserts are folded for insertion into the sending envelope and the thickness of the folded form is recorded. The individual insert weight and thickness data for each type of insert and sending envelope is stored in data files 35 for later use in the system. Weight and thickness consideration of a typical mailing tray are standard values, but may be determined in a similar manner.

Usually, the plan selection data 20 is used by the central computer, along with the individual weight and thickness data 35 and other relevant processing data, to generate a pregrouping (without considering exact postal discount rules for optimum benefits) electronically formatted mailing pieces 40 (eventually these will be physical mailing pieces). The pregrouping is based on the unique combination of insert types that are inserted into each sending envelope, weight ranges, thickness ranges, physical equipment requirement, capabilities, and limitation, and like considerations that aid in maximizing the efficiency and cost benefits of the subject system. The results of the pregrouping process is then stored in data form 45 for later use by the system.

A postal agency's direct mail rules 50 are included in the information available to the central computer. For example, in the United States, the United States Postal Service direct mail rules and regulation are employed in the subject process.

The postal qualification process 55 for accessing and optimizing the benefits of the postal agency's rules is carried out by the overseeing central computer. The central computer programmed qualification process utilizes the postal rules and regulations 50, individual insert thickness and weight determinations 35, and pregrouping information 45 to presort electronic mail pieces (the theoretical pieces that will eventually be mailed in their physical form as actual mailing pieces) into appropriate postal discount structures. Based on the applicable postal traying rules, the computer directed process 55 then prearranges (before physically arranging the mailing pieces in the mailing trays) the mailing pieces in sequence (alphabetical, ordered zip codes, or any other desired sequence) within individual bundles (a bundle is a postal rules dictated subdivision of mailing pieces that is usually rubber-banded within a mailing tray) and mailing trays. Once again, the postal agency traying rules control mailing piece combinations that produce acceptable thicknesses for bundles and mailing tray total thickness limits. In this process 55 unique identification is assigned to each mailing piece. The unique identification may include customer information, consumer information, bundling requirements, and the like. Also, the process 55 maximizes or optimizes the postal discount by applying (through standard types of programming techniques) the postal rules and minimizes the number of bundles while meeting the postal rule requirements for bundle size and mailing tray limits. The process 55 identifies the first and last mailing piece (and thus the ones in between too) held within each bundle, mailing tray, and customer job. Specifically, for a particular loaded mailing tray, the first-to-last range exactly indicates which of the consumers are within that mailing tray. The specific identification of each mailing piece within each mailing unit is especially helpful in tracking a particular mailing piece. It should be appreciated that only a few of the various possible postal rules have been noted here and that other rule consideration are easily incorporated into the programming of the system.

A postal rules qualified data base 60 is created and holds the electronically grouped mailing pieces by exact mailing piece sequence within each mailing tray and postal rate qualifications within each selected customer plan. The files within this data base 60 also contain printing, inserting, tray loading, and overlay (printing a logo, trademark or other information on a form or similar operation) controls.

The physical process of creating the mailing pieces 65 is overseen and controlled by the central computer using the postal rules qualified data base 60 and includes the initial printing, inserting, and tray loading events. Each billing statement and other document that requires printing is printed at this stage by an appropriately controlled printing means. Plan selected inserts are inserted by insertion means into a sending envelope. As indicated above, the mailing pieces are loaded into a mailing tray based on known first and last mailing pieces.

Preferably, after the mailing tray loading operation a line control check 70 is performed to establish if the actual number of mailing pieces placed in the tray by the loader corresponds to the projected number of mailing pieces calculated by the central computer in the optimization process 55. Usually, the line control check 70 is carried out by a local computer in communication with the central computer. Should a difference be found between the actual and projected number of mailing pieces within a mailing tray the tray is rejected 75. Generally, rejected mailing trays are processed further by manual inspection and resolution. Accepted mailing trays proceed to the next station in the process.

Based on the information developed in the postal qualification process 55 a mailing tray data base 80 is created. This data base 80 contains the information needed to print both a mailing tray label and an ACT tag. Each mailing tray label contains information identifying the contents of the tray, such as customer, first and last mailing piece, necessary bundling restrictions, included zip codes, and like facts. The ACT tag indicates the mailing destination airport, such as LAX for Los Angeles and similar location information.

The mailing tray label and ACT tag data 80 is employed to print 85 the corresponding items. Usually, the printed label contains information in both machine readable form (such as a bar code) and, at least in part, in directly human readable form. Although the mailing tray label and ACT tag are usually printed as a single unit, separate items may be generated. The printed mailing tray labels and ACT tags are conveyed 90 to the mailing tray processing line for application 95 to accepted mailing trays by suitable means.

From the postal qualification process 55, a mailing tray management data base 100 is created. Included in this data base 100 are the projected mailing tray weights, thickness, and mailing pieces included.

After a mailing tray is labeled 95, each mailing tray is physically weighed 105 by appropriate means. Immediately following the actual weighing, a line control check is performed 110 to determine if the actual weight compares favorably with the projected weight (from data base 100) for the tray. This comparison means 110 establishes an acceptable weight variance between the actual and projected tray weights. The amount or size of an acceptable weight variance is within the realm of the exact postal rules and quality control limitations. Naturally, the weight of the mailing tray is considered in the weighing and is substracted in the process. Usually, the line control check 110 is carried out by a local computer in communication with the central computer. Should a difference be found between the actual and projected weights of the loaded mailing trays, the mailing tray is rejected and is processed 115 for resolution. Accepted mailing trays proceed on in the mailing process.

Although mechanical means may be employed in the remaining steps of the a typical mailing, usually, a technician's physical handling of the mailing trays starts. Next, the acceptable weight mailing tray is passed to a question and answer process for quality control 110 that is based on the postal agency's rules and regulations for a mailing tray.

Following the quality control 110 inspection is a bundling process 125 that associates the required mailing pieces into the necessary bundles, as required by the postal rules and indicated of each mailing piece.

A final quality control check 130 is performed in which all of the required postal rules are verified as being applied to each mailing tray. If a tray fails it is recycled to correct the errors. Accepted and released mailing trays proceed to a tray mailing station 135 in which the tray bar codes are read and communicated to the central computer for establishing the actual postage due to the postal agency.

The mailing trays are then loaded 140 onto an appropriate transportation holder such as an airstop cage for conveyance into the postal agency's delivery system 145. The mailing events end at this point 150.

For purposes of tracking exactly what is mailed and for meeting the requirements of the postal agency, the postal qualifying process 55 creates a postal agency manifest and postage data base 155. From this data base 155 is drawn the information necessary for printing 160 postal agency manifests and postage reports 165.

Further, the manifest and postage data base 155 can be employed in an automated electronic conveyance 170 of the included information to the necessary organizations to accomplish electronic funds transfers and postage payments.

Figure 2:
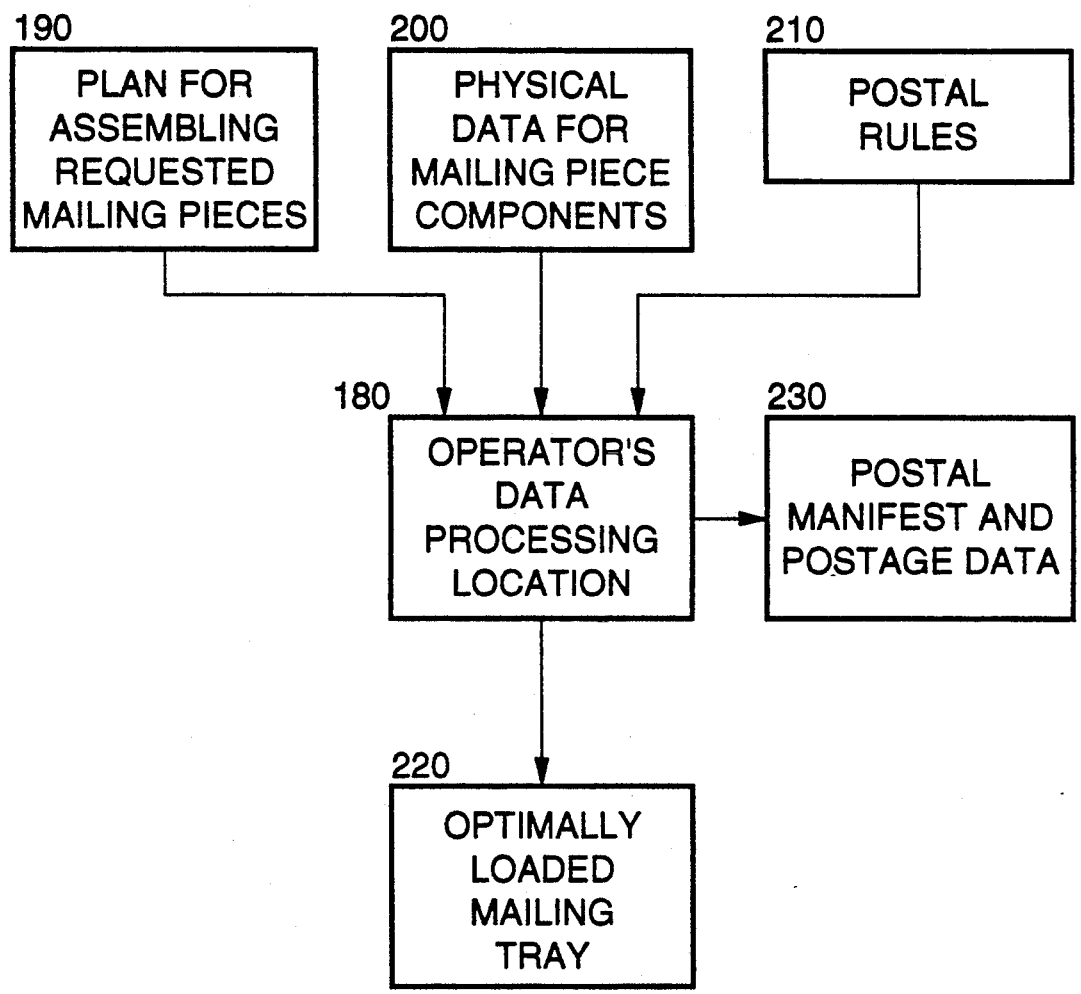
FIG. 2 is a summary flow diagram of the central components of the subject invention.

By way of summary for the central components of the subject system, as illustrated in FIG. 2, the operator of the system has a data processing location 180 that comprises the computer means noted above. At the request of customers, plans are created 190 for assembling the various inserts and envelopes into the desired consumer directed mailing pieces. The physical data concerning the inserts and envelope individual thickness and weight determinations 200 are collected and communicated to the central data processing location. Further, the applicable postal rules are transferred from the data base containing the rules 210 to the operator's data processing location. The input information is then employed to load optimally each mailing tray 220 for mailing. Additionally, postal manifest and postage data 230 is provided from the data processing location.

The invention has now been explained with reference to specific embodiments. Other embodiments will be suggested to those of ordinary skill in the appropriate art upon review of the present specification.

Although the foregoing invention has been described in some detail by way of illustration and example for purposes of clarity of understanding, it will be obvious that certain changes and modifications may be practiced within the scope of the appended claims.

What is claimed is:

1. For use by an operator engaged in sending mailing pieces comprising a sending envelope containing various types and quantities of inserts to specific consumers, a computer directed system for optimizing efficiency and cost benefits derived from utilizing a postal agency's mailing discount rates that require adherence to a set of postal agency qualification rules, comprising:

a) means for determining an individual weight and thickness of each said insert type and said sending envelope and for communicating said individual weight and thickness determinations to a data processing location;
   b) means for inserting selectively each said insert into one said sending envelope to produce said mailing piece as directed from said data processing location;
   c) means for loading a plurality of mailing trays each with a plurality of said mailing pieces, wherein said loading is directed from said data processing location;
   d) means for printing and applying a mailing tray label for each said loaded mailing tray, wherein each said mailing tray label indicates which said specific consumers' mailing pieces are loaded in each said loaded mailing tray as directed from said data processing location;
   e) means for determining an actual weight of each said loaded mailing tray;
   f) means for comparing said actual weight of each said loaded mailing tray with a projected weight to establish an acceptable weight variance and rejecting each loaded mailing tray not within said acceptable weight variance, wherein each said loaded mailing tray projected weight is provided from said data processing location; and
   g) a computer at said data processing location having:
      data storage means with information files containing:
         consumer data indicating a quantity for each said insert type to be inserted into each said sending envelope;
         said postal agency qualification rules;
         said communicated individual weight and thickness determinations for each said insert type and said sending envelope;
         weight data for said mailing tray in an unloaded state; and
      a program utilizing said information files for processing said efficiency and cost benefits optimization, wherein said program performs the operations of:
         calculating from said communicated individual thickness determinations a projected number of mailing pieces within each said loaded mailing tray, wherein said projected thickness is acceptable under said postal agency rules;
         calculating said projected weight of each said loaded mailing tray from mailing tray weight, said communicated individual weights, and said projected number of mailing pieces within each said loaded mailing tray and communicating said loaded mailing tray projected weight to said comparison means for accepting or rejecting each said mailing tray; and
         determining, based on said projected number of mailing pieces within each said loaded mailing tray, a range indicating which said specific consumers are within each said loaded mailing tray and directing said mailing tray label printing and applying means to denote said range of specific consumers on said mailing tray label.

2. A computer directed system according to claim 1, further comprising means for determining the actual number of mailing pieces loaded into each said mailing tray and means for rejecting each said mailing tray not having said actual number of mailing pieces the same as said projected number of mailing pieces as calculated by said computer to be loaded into each said mailing tray.

3. A computer directed system according to claim 1, wherein said mailing tray printing and mailing means prints and applies in addition to said mailing tray label an ACT tag indicating a destination airport location for said mailing tray.

4. A computer directed system according to claim 1, further comprising means for creating a mailing manifest with associated postage data and for printing said mailing manifest and postage data in report form as directed by said computer.

5. A computer directed system according to claim 1, further comprising means for creating a mailing manifest with associated postage data and for electronically transferring said created mailing manifest and postage data to a facility for transferring funds in payment of postage due for sending said mailing pieces.

6. A computer directed system according to claim 1, wherein said acceptable number of mailing pieces held in each said mailing tray is based on a calculated projected total thickness for each said mailing piece that is determined by combining said communicated individual thicknesses of each said sending envelope and said inserts within each said sending envelope and determining if the projected total thickness meets said postal agency rules for an acceptable total thickness of a loaded mailing tray.

7. For use by an operator engaged in sending mailing pieces comprising a sending envelope containing various types and quantities of inserts to specific consumers, a computer directed system for optimizing efficiency and cost benefits derived from utilizing a postal agency's mailing discount rates that require adherence to a set of postal agency qualification rules and for tracking to delivery said mailing pieces, comprising:

a) means for determining an individual weight and thickness of each said insert type and said sending envelope and for communicating said individual weight and thickness determinations to a data processing location;

b) means for inserting selectively each said insert into one said sending envelope to produce said mailing piece as directed from said data processing location;

c) means for loading a plurality of mailing trays each with a plurality of said mailing pieces, wherein said loading is directed from said data processing location;

d) means for printing and applying a mailing tray label for each said loaded mailing tray, wherein each said mailing tray label indicates which said specific consumers' mailing pieces are loaded in each said loaded mailing tray as directed from said data processing location;

e) means for determining an actual weight of each said loaded mailing tray;

f) means for comparing said actual weight of each said loaded mailing tray with a projected weight to establish an acceptable weight variance and rejecting each loaded mailing tray not within said acceptable weight variance, wherein each said loaded mailing tray projected weight is provided from said data processing location;

g) means for determining the actual number of mailing pieces loaded into each said mailing tray and means for rejecting each said mailing tray not having said actual number of mailing pieces the same as said projected number of mailing pieces to be loaded into each said mailing tray; and h) a computer at said data processing location having:
data storage means with information files containing:
consumer data indicating a quantity for each said insert type to be inserted into each said sending envelope;
said postal agency qualification rules;
said communicated individual weight and thickness determinations for each said insert type and said sending envelope;
weight data for said mailing tray in an unloaded state; and
a program utilizing said information files for processing said efficiency and cost benefits optimization, wherein said program performs the operations of:
calculating from said communicated individual thickness determinations a projected number of mailing pieces within each said loaded mailing tray, wherein said projected thickness is acceptable under said postal agency rules and said acceptable number of mailing pieces held in each said mailing tray is based on a calculated projected total thickness for each said mailing piece that is determined by combining said communicated individual thicknesses of each said sending envelope and said inserts within each said sending envelope and determining if the projected total thickness meets said postal agency rules for an acceptable total thickness of a loaded mailing tray;
calculating said projected weight of each said loaded mailing tray from mailing tray weight, said communicated individual weights, and said projected number of mailing pieces within each said loaded mailing tray and communicating said loaded mailing tray projected weight to said comparison means for accepting or rejecting each said mailing tray; and
determining, based on said projected number of mailing pieces within each said loaded mailing tray, a range indicating which said specific consumers are within each said loaded mailing tray and directing said mailing tray label printing and applying means to denote said range of specific consumers on said mailing tray label.

8. A computer directed system according to claim 7, wherein said mailing tray printing and mailing means prints and applies in addition to said mailing tray label an ACT tag indicating a destination airport location for said mailing tray.

9. A computer directed system according to claim 7, further comprising means for creating a mailing manifest with associated postage data and for printing said mailing manifest and postage data in report form as directed by said computer.

10. A computer directed system according to claim 7, further comprising means for creating a mailing manifest with associated postage data and for electronically transferring said created mailing manifest and postage data to a facility for transferring funds in payment of postage due for sending said mailing pieces.

* * * * *